S. E. WARREN.
FRUIT PRESS.
APPLICATION FILED JULY 10, 1908.

950,523.

Patented Mar. 1, 1910.
2 SHEETS—SHEET 1.

Witnesses
Jos. A. Ryan
Inventor
Samuel E. Warren
By Victor J. Evans
Attorney

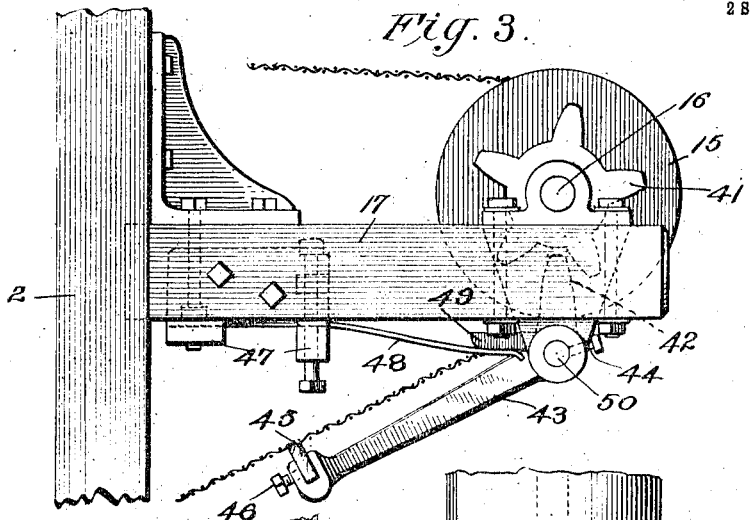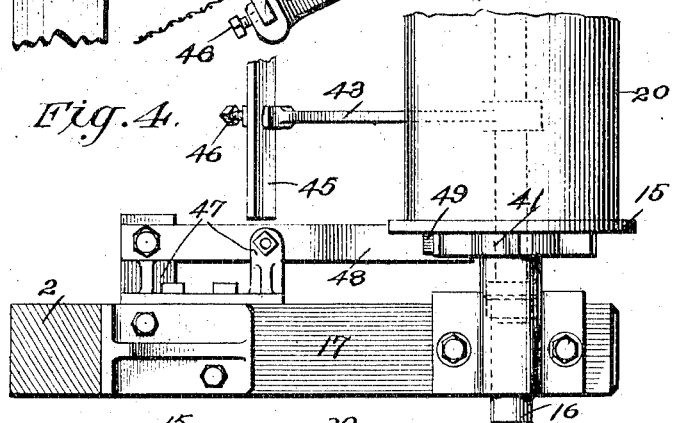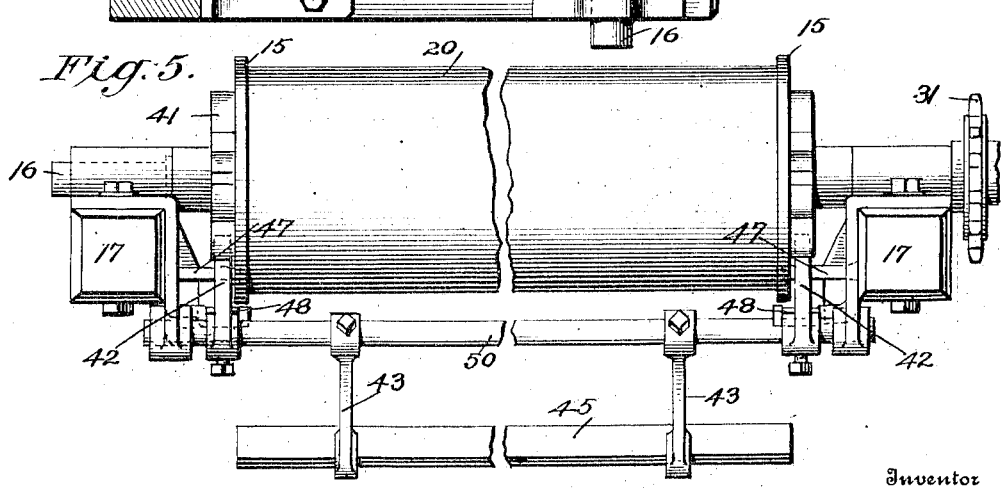

UNITED STATES PATENT OFFICE.

SAMUEL E. WARREN, OF EUREKA, CALIFORNIA.

FRUIT-PRESS.

950,523.  Specification of Letters Patent.  Patented Mar. 1, 1910.

Application filed July 10, 1908. Serial No. 442,884.

*To all whom it may concern:*

Be it known that I, SAMUEL E. WARREN, a citizen of the United States, residing at Eureka, in the county of Humboldt and State of California, have invented new and useful Improvements in Fruit-Presses, of which the following is a specification.

This invention relates to improvements in fruit pressers designed more especially in grinding apples and making cider, and one of the objects of the invention is to provide a machine which can be continuously operated for grinding the fruit and expressing the juice from the ground pulp.

Another object of the invention is to improve my patented device No. 871,653 by providing a continuous conveying belt having a pair of expressing rollers one positioned below the belt, the other positioned directly above the belt and coacting with the lower roller, the upper expressing roller being provided with an inclined continuous belt constructed of suitable impervious material and designed to feed the fruit directly between the rollers without danger of clogging, the upper expressing roller being provided with an arbor bearing, normally forced downward in contact with the opposite roller through the medium of suitable resilient elements, the conveyer belt being also provided with suitable beater arms adapted to contact the belt continuously, the impact of which causes the dry pomace to drop from the apron thus effectively cleaning the conveyer.

With these and other objects in view the invention resides in the novel construction and arrangement of elements hereinafter fully described and claimed.

Figure 1:
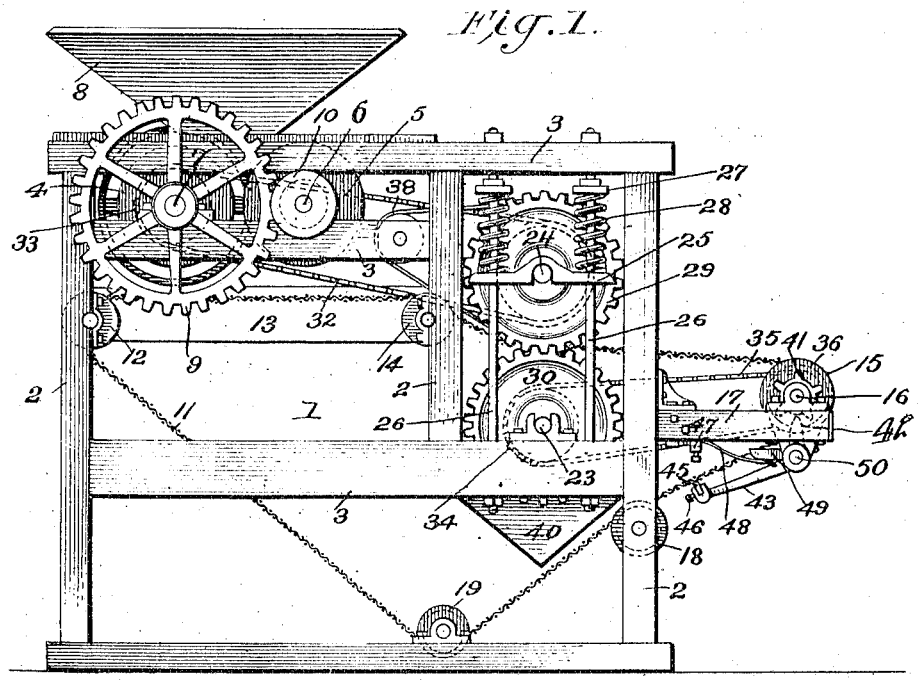
Figure 2:
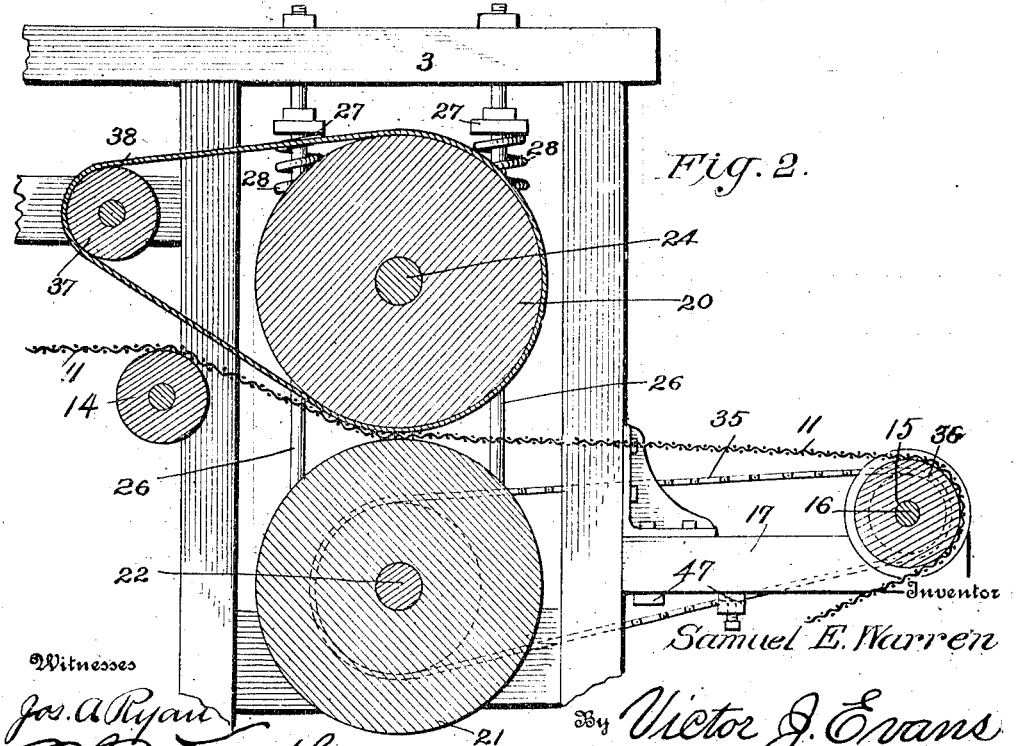

In the accompanying drawings, Figure 1 is a side elevation of a machine constructed in accordance with the present invention. Fig. 2 is an enlarged longitudinal sectional view through the expressing rollers. Fig. 3 is a detail, enlarged side elevation of the portion of the machine carrying the beating arms. Fig. 4 is a detail view of Fig. 3 illustrating the rear roller of the conveying belt in plan, the belt being removed. Fig. 5 is a detail plan view similar to Fig. 4, but illustrating both ends of the roller.

In the accompanying drawings the numeral 1 designates the frame of the machine. This frame 1 is of a substantially rectangular form comprising a plurality of vertical members or beams 2 connected by a plurality of longitudinal beams 3 and suitable transverse securing beams. Supported upon the frame are two grinding rollers 4 and 5, said rollers being mounted upon shafts 6 and 7 journaled in suitable keepers upon the frame. A suitable hopper 8 is placed over the rollers 4 and 5 to receive the fruit and guide the same between the rollers 4 and 5. Upon the shaft 7 a suitable toothed wheel 9 is fixed, and this wheel is adapted to mesh with a smaller toothed wheel carried by the shaft 6. The shaft 6 may be also provided with a suitable pulley, not shown which may be connected to a motor or other source of power if desired, but if the machine is of such a size that it may be run by hand a crank will be attached to the said shaft. A conveyer belt 11, preferably constructed of woven galvanized wire is provided. This endless belt or conveyer passes around a roller 12 through a suitable trough or receptacle 13, over a roller 14 and from thence at an inclination over a roller 15, mounted upon a suitable shaft 16 supported upon an extension 17 at one end of the frame, and the belt is then brought over a roller 18 and from thence below a roller 19 positioned at the bottom of the frame, back to the roller 12. The belt 11 is extended through the trough 13 between the rollers 12 and 14, in a substantially horizontal plane, as illustrated in Fig. 1 of the drawing, and the inclined upper portion of the belt between the rollers 14 and 15 is adapted to be contacted by a pair of coacting expressing rollers 20 and 21. The roller 21 is mounted upon a suitable shaft 22 positioned in bearings 23 upon the longitudinal intermediate beams 3 and below the conveyer belt 11. The roller 20 is provided with a suitable shaft or axle 24, the ends of which being engaged by yoke bearings 25 having openings adapted for engagement with vertical rods 26 positioned between the intermediate and top beams of the frame adjacent each side of the axles 22 and 24. The upper portion of each of the rods 26 is threaded and is adapted for the reception of a threaded nut 27. Interposed between these nuts 27 and the bearing 25 are resilient elements 28 adapted to normally force the roller 20 toward the roller 21. The rollers 20 and 21 are each provided with intermeshing gear wheels 29 and 30, and the roller 20 is provided with a sprocket wheel 31 which receives an endless chain 32 which also engages a similar sprocket wheel 33 carried by the axle 7. The axle 23 is also provided with a sprocket wheel 34 adapted for the reception of an endless chain 35 which engages with a suitable sprocket wheel 36 carried by the shaft 16. By this arrangement it will be noted that as motion is imparted to the shaft 6 the gear wheel carried thereby rotates the sprocket wheel 9, thus turning the shaft 7 and imparting motion to the sprocket wheel 33, which in turn, through the medium of the chain 32 revolves the expressing roller 20. The gear wheel 29 meshing with the gear wheel 30 revolves the expressing roller 21 and which in turn through the medium of the sprocket wheel 34 and the chain 35 imparts motion to the roller 15. By this arrangement it will be noted that the grinding rollers, expressing rollers and conveying belt are all given a continuous motion when the shaft 7 is revolved.

The frame 1 is provided with a suitable roller 37 positioned forward of the expressing roller 20 and adapted for the reception of a continuous belt 38. This belt is of a width equaling that of the reticulated conveyer belt 11, and is constructed of some suitable impervious material and arranged at an angle greater than the angle of inclination between the roller 14 and the rollers 20 and 21, so as to provide a substantially open mouth between the belts 38 and 11, whereby the pomace is guided between the rollers.

Positioned between the intermediate beams 3 of the frame and directly below the expressing rollers is a suitable trough 40, which is adapted to serve as a receptacle to receive the juice extracted from the pomace by the expressing rollers.

Secured to the axle 16 upon each end of the roller 15 is a suitable toothed wheel 41. The teeth of these wheels 41 are adapted to contact with fingers 42 provided upon a shaft 50 having beater arms 43. The arms 4" are pivotally connected to the frame extension 17 through the medium of suitable bearings 44 and the said arms are provided with bifurcated ends adapted for the reception of a transverse connecting member 45. This member 45 is preferably constructed of wood and is retained in position upon the arms through the medium of suitable threaded elements, such as bolts 46. The member 45 is of a length equaling the width of the conveyer 16 and is adapted to lie normally in contact with the inclined portion of the conveyer belt between the rollers 15 and 18, as clearly illustrated in Figs. 1 and 3 of the drawings. The shaft 50 is provided with an offset 49 arranged at substantially a right angle with relation to the finger 42, and this offset 49 is normally contacted by a leaf spring 48 which has its opposite ends mounted in bearings 47 carried by the extension 17. By this arrangement it will be noted that the member 45 is forced normally into contact with the reticulated conveyer belt, and that when the roller 15 is rotated in the direction of the arrow one of the teeth of the wheel 41 will contact the finger 42 of the beater arms to rotate the said arms upon their shaft 50, thus forcing the member 45 away from the reticulated conveyer. It is to be understood that the teeth of the wheel 41 are spaced quite a distance apart and it will be noted that after one of the teeth of the said wheel has passed the finger 42 the spring 48 bearing against the offset 49 will force the arm 43 backward into normal position and cause the member 45 to violently strike the reticulated conveyer, thus effectively forcing all pomace from the belt. By this construction and arrangement of parts it will be noted that the member 45 having the spring 48 contacting the offset 49 is forcibly pressed against the reticulated conveyer, and that the said conveyer being constructed of spaced wire presents an uneven surface so as to impart a vibratory movement to the arm as the belt passes thereover which effectively stirs the pomace upon the belt and that the toothed wheel 41 causes the said arm to knock violently against the belt thus forcing the stirred pomace or cheese from off the belt.

Having fully described the invention what is claimed as new is:

The combination with a frame, grinding members upon the frame, means for imparting motion to the grinding members, a trough below the grinding members, guide rollers upon the frame, an endless belt conveyer constructed of wire upon the guiding members and passing through the trough, expressing rollers positioned above and below the wire conveyer, a yoke bearing for the upper roller, resilient elements contacting the bearing to force the roller against the upper face of the belt and into contact with the lower roller to arrange the belt at an angle from the trough, means for regulating the tension of the resilient elements, a roller upon the frame above the trough, an impervious belt engaging this roller and the upper expressing roller, an extension upon the frame for one of the guiding rollers, a shaft upon the extension and arranged transversely thereof, right angularly arranged fingers upon this shaft, a toothed wheel upon the roller of the extension within the path of one of the fingers, leaf springs engaging the opposite finger, arms upon the shaft provided with bifurcated ends, a transverse member within these bifurcated ends normally contacting the wire belt, and means for rotating the expressing rollers and the guiding rollers of the belt.

In testimony whereof I affix my signature in presence of two witnesses.

SAMUEL E. WARREN.

Witnesses:
CHARLES P. CUPPER,
CHARLOTTE P. MOORE.